United States Patent
Vas et al.

(10) Patent No.: US 11,416,339 B1
(45) Date of Patent: *Aug. 16, 2022

(54) VALIDATING REQUESTS BASED ON STORED VAULT INFORMATION

(71) Applicant: Pure Storage, Inc., Mountain View, CA (US)

(72) Inventors: Sebastien Vas, Sunnyvale, CA (US); Zachary J. Mark, Chicago, IL (US); Jason K. Resch, Chicago, IL (US)

(73) Assignee: PURE STORAGE, INC., Moutain View, CA (US)

(*) Notice: Subject to any disclaimer, the term of this patent is extended or adjusted under 35 U.S.C. 154(b) by 106 days.

This patent is subject to a terminal disclaimer.

(21) Appl. No.: 16/988,135

(22) Filed: Aug. 7, 2020

Related U.S. Application Data

(63) Continuation of application No. 16/390,530, filed on Apr. 22, 2019, now Pat. No. 11,194,662, which is a
(Continued)

(51) Int. Cl.
*G06F 16/13* (2019.01)
*G06F 11/10* (2006.01)
(Continued)

(52) U.S. Cl.
CPC ...... *G06F 11/1092* (2013.01); *G06F 11/0727* (2013.01); *G06F 11/141* (2013.01);
(Continued)

(58) Field of Classification Search
CPC .............................. G06F 16/13; G06F 16/137
See application file for complete search history.

(56) References Cited

U.S. PATENT DOCUMENTS 4,092,732 A   5/1978 Ouchi
5,454,101 A   9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Eliyah S. Harper
(74) *Attorney, Agent, or Firm* — Garlick & Markison; Timothy W. Markison; Timothy D. Taylor

(57) ABSTRACT

A system includes a plurality of storage units, where one or more storage vaults is associated with the plurality of storage units and each storage vault of the one or more storage vaults represents a software-constructed grouping of storage units of the plurality of storage units. The software-constructed grouping of storage units stores encoded data slices. A data segment is encoded using an information dispersal algorithm to produce the encoded data slices. The system further includes a grid access manager that generates a data structure pertaining to the software-constructed grouping of storage units. A storage unit of the software-constructed grouping of storage units receives, from a client computer of the system, a request regarding the data segment, obtains, from the data structure, information regarding the request, determines whether the request is valid based on the information regarding the request, and when the request is valid, executes the request.

12 Claims, 4 Drawing Sheets

Related U.S. Application Data continuation of application No. 14/447,890, filed on Jul. 31, 2014, now Pat. No. 10,360,180, which is a continuation of application No. 13/154,725, filed on Jun. 7, 2011, now Pat. No. 10,289,688, said application No. 14/447,890 is a continuation-in-part of application No. 12/749,592, filed on Mar. 30, 2010, now Pat. No. 8,938,591, which is a continuation-in-part of application No. 12/218,594, filed on Jul. 16, 2008, now Pat. No. 7,962,641, which is a continuation-in-part of application No. 11/973,613, filed on Oct. 9, 2007, now Pat. No. 8,285,878, and a continuation-in-part of application No. 11/973,622, filed on Oct. 9, 2007, now Pat. No. 8,171,101, and a continuation-in-part of application No. 11/973,542, filed on Oct. 9, 2007, now Pat. No. 9,996,413, and a continuation-in-part of application No. 11/973,621, filed on Oct. 9, 2007, now Pat. No. 7,904,475, and a continuation-in-part of application No. 11/241,555, filed on Sep. 30, 2005, now Pat. No. 7,953,937, and a continuation-in-part of application No. 11/403,684, filed on Apr. 13, 2006, now Pat. No. 7,574,570, and a continuation-in-part of application No. 11/404,071, filed on Apr. 13, 2006, now Pat. No. 7,574,579, and a continuation-in-part of application No. 11/403,391, filed on Apr. 13, 2006, now Pat. No. 7,546,427, and a continuation-in-part of application No. 12/080,042, filed on Mar. 31, 2008, now Pat. No. 8,880,799, and a continuation-in-part of application No. 12/218,200, filed on Jul. 14, 2008, now Pat. No. 8,209,363.

(60) Provisional application No. 61/237,624, filed on Aug. 27, 2009, provisional application No. 61/357,430, filed on Jun. 22, 2010.

(51) Int. Cl.
| | |
|---|---|
| *H04L 9/40* | (2022.01) |
| *H04L 9/32* | (2006.01) |
| *G06F 11/16* | (2006.01) |
| *H04L 67/06* | (2022.01) |
| *G06F 11/07* | (2006.01) |
| *G06F 11/14* | (2006.01) |
| *H04W 12/30* | (2021.01) |
| *H04W 12/041* | (2021.01) |
| *H04W 12/0431* | (2021.01) |
| *H04L 67/1097* | (2022.01) |
| *G06F 21/62* | (2013.01) |
| *G06F 21/31* | (2013.01) |
| *H04W 12/10* | (2021.01) |

(52) U.S. Cl.
CPC ............ *G06F 11/167* (2013.01); *G06F 16/13* (2019.01); *H04L 9/3242* (2013.01); *H04L 9/3247* (2013.01); *H04L 9/3263* (2013.01); *H04L 9/3271* (2013.01); *H04L 63/06* (2013.01); *H04L 63/12* (2013.01); *H04L 67/06* (2013.01); *H04W 12/041* (2021.01); *H04W 12/0431* (2021.01); *H04W 12/35* (2021.01); *G06F 16/137* (2019.01); *G06F 21/31* (2013.01); *G06F 21/6209* (2013.01); *G06F 2211/1028* (2013.01); *H04L 63/0428* (2013.01); *H04L 67/1097* (2013.01); *H04L 2209/043* (2013.01); *H04L 2209/30* (2013.01); *H04L 2209/34* (2013.01); *H04L 2209/56* (2013.01); *H04L 2209/80* (2013.01); *H04W 12/10* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A * | 9/1998 | Senator ............... G06F 9/52 719/325 |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,574,570 B2 | 8/2009 | Gladwin et al. |
| 7,636,724 B2 | 12/2009 | De La Torre |
| 7,904,475 B2 | 3/2011 | Gladwin |
| 7,962,641 B1 | 6/2011 | Dhuse |
| 8,171,101 B2 | 5/2012 | Gladwin |
| 8,209,363 B2 | 6/2012 | Palthepu |
| 8,281,181 B2 | 10/2012 | Resch |
| 8,285,878 B2 | 10/2012 | Gladwin |
| 8,464,133 B2 | 6/2013 | Grube |
| 8,880,799 B2 | 11/2014 | Foster |
| 8,938,591 B2 | 1/2015 | Mark |
| 9,332,422 B2 | 5/2016 | Bai |
| 9,661,074 B2 * | 5/2017 | Peake ............... G06F 3/067 |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |

(56) References Cited

U.S. PATENT DOCUMENTS

| | | | |
|---|---|---|---|
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2007/0079081 | A1 | 4/2007 | Gladwin |
| 2007/0079082 | A1 | 4/2007 | Gladwin |
| 2007/0079083 | A1 | 4/2007 | Gladwin |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0283167 | A1 | 12/2007 | Venters, III |
| 2009/0037500 | A1 | 2/2009 | Kirshenbaum |
| 2009/0094251 | A1 | 4/2009 | Gladwin |
| 2009/0094318 | A1 | 4/2009 | Gladwin |
| 2010/0023524 | A1 | 1/2010 | Gladwin |
| 2010/0268692 | A1 | 10/2010 | Resch |
| 2011/0055277 | A1* | 3/2011 | Resch ................. G06F 11/1024 707/E17.032 |
| 2011/0126060 | A1 | 5/2011 | Grube |
| 2011/0289122 | A1* | 11/2011 | Grube ................. H04L 67/1097 707/812 |
| 2012/0290868 | A1* | 11/2012 | Gladwin ............. G06F 11/1092 714/E11.023 |
| 2014/0330923 | A1* | 11/2014 | Baptist ................ G06F 11/1474 709/213 |
| 2016/0026405 | A1* | 1/2016 | Dhuse ................. H04L 67/1097 711/114 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

VALIDATING REQUESTS BASED ON STORED VAULT INFORMATION

CROSS REFERENCE TO RELATED PATENTS

The present U.S. Utility Patent Application claims priority pursuant to 35 U.S.C. § 120 as a continuation of U.S. Utility application Ser. No. 16/390,530, entitled "Digest Listing Decomposition", filed Apr. 22, 2019, which is a continuation of U.S. Utility application Ser. No. 14/447,890, entitled "Digest Listing Decomposition", filed Jul. 31, 2014, issued as U.S. Pat. No. 10,360,180 on Jul. 23, 2019, which is a continuation of U.S. Utility application Ser. No. 13/154,725, entitled, "Metadata Access In A Dispersed Storage Network", filed Jun. 7, 2011, issued as U.S. Pat. No. 10,289,688 on May 14, 2019, which claims priority pursuant to 35 U.S.C. § 119(e) to U.S. Provisional Application No. 61/357,430, entitled "Dispersal Method In A Dispersed Storage System", filed Jun. 22, 2010, all of which are hereby incorporated herein by reference in their entirety and made part of the present U.S. Utility Patent Applications for all purposes.

U.S. Utility application Ser. No. 14/447,890 also claims priority pursuant to 35 U.S.C. § 120 as a continuation-in-part of U.S. Utility application Ser. No. 12/749,592, entitled "Dispersed Storage Processing Unit And Methods With Data Aggregation For Use In A Dispersed Storage System", filed Mar. 30, 2010, issued as U.S. Pat. No. 8,938,591 on Jan. 20, 2015, which claims priority pursuant to 35 U.S.C. § 119(e) to U.S. Provisional Application No. 61/237,624, entitled "Dispersed Storage Unit And Methods With Metadata Separation For Use In A Dispersed Storage System", filed Aug. 27, 2009.

U.S. Utility application Ser. No. 12/749,592 also claims priority pursuant to 35 U.S.C. § 120 as a continuation-in-part of U.S. Utility application Ser. No. 12/218,594, entitled "Streaming Media Software Interface To A Dispersed Data Storage Network", filed Jul. 16, 2008, issued as U.S. Pat. No. 7,962,641 on Jun. 14, 2011, which claims priority pursuant to 35 U.S.C. § 120 as a continuation-in-part of:

1. U.S. Utility application Ser. No. 11/973,613, entitled "Block Based Access To A Dispersed Data Storage Network", filed Oct. 9, 2007, issued as U.S. Pat. No. 8,285,878 on Oct. 9, 2012;

2. U.S. Utility application Ser. No. 11/973,622, entitled "Smart Access To A Dispersed Data Storage Network", filed Oct. 9, 2007, issued as U.S. Pat. No. 8,171,101 on May 1, 2012;

3. U.S. Utility application Ser. No. 11/973,542, entitled "Ensuring Data Integrity On A Dispersed Storage Network", filed Oct. 9, 2007, issued as U.S. Pat. No. 9,996,413 on Jun. 12, 2018;

4. U.S. Utility application Ser. No. 11/973,621, entitled "Virtualized Storage Vaults On A Dispersed Data Storage Network", filed Oct. 9, 2007, issued as U.S. Pat. No. 7,904,475 on Mar. 8, 2011;

5. U.S. Utility application Ser. No. 11/241,555, entitled "System, Methods, And Apparatus For Subdividing Data For Storage In A Dispersed Data Storage Grid", filed Sep. 30, 2005, issued as U.S. Pat. No. 7,953,937 on May 31, 2011;

6. U.S. Utility application Ser. No. 11/403,684, entitled "Billing System For Information Dispersal System", filed Apr. 13, 2006, issued as U.S. Pat. No. 7,574,570 on Aug. 11, 2009;

7. U.S. Utility application Ser. No. 11/404,071, entitled "Metadata Management System For An Information Dispersed Storage System", filed Apr. 13, 2006, issued as U.S. Pat. No. 7,574,579 on Aug. 11, 2009;

8. U.S. Utility application Ser. No. 11/403,391, entitled "System For Rebuilding Dispersed Data", filed Apr. 13, 2006, issued as U.S. Pat. No. 7,546,427 on Jun. 9, 2009;

9. U.S. Utility application Ser. No. 12/080,042, entitled "Rebuilding Data On A Dispersed Storage Network", filed Mar. 31, 2008, issued as U.S. Pat. No. 8,880,799 on Nov. 4, 2014, and 10. U.S. Utility application Ser. No. 12/218,200, entitled "File System Adapted For Use With A Dispersed Data Storage Network", filed Jul. 14, 2008, issued as U.S. Pat. No. 8,209,363 on Jun. 26, 2012.

In addition, this patent application is related to the following U.S. patent applications that are commonly owned:

1. "Dispersed Storage Unit And Methods With Metadata Separation For Use In A Dispersed Storage System", application Ser. No. 12/749,583, filed on Mar. 30, 2010, issued as U.S. Pat. No. 9,235,350 on Jan. 12, 2016.

2. "Dispersed Storage Processing Unit And Methods With Operating System Diversity For Use In A Dispersed Storage System", application Ser. No. 12/749,606, filed on Mar. 30, 2010, issued as U.S. Pat. No. 9,690,513 on Jun. 27, 2017.

3. "Dispersed Storage Processing Unit And Methods With Geographical Diversity For Use In A Dispersed Storage System", application Ser. No. 12/749,625, and filed on Mar. 3, 2011, issued as U.S. Pat. No. 9,772,791 on Sep. 26, 2017.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

The problem of reconstructing data stored on a digital medium that is subject to damage has been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference. Schemes for implementing dispersed data storage networks ("DDSN"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Prior art DDSN systems are only viable for extremely specialized applications, as implementing an effective DDSN requires that a user setup a network of slice servers in multiple physically disparate locations. Existing directory service software will not effectively manage access to a DDSN, particularly as a DDSN does not have physical resources in the sense of a disk drive or directory, but rather is a type of virtual drive, where information is spread across numerous slice servers. Therefore, software for managing access to a DDSN would make DDSN technology accessible to a wider variety of applications.

In addition, the management and administration of a DDSN presents other problems that are not associated with prior art systems. For example, different users of a DDSN may want to store their data in different ways, i.e., one user may want all of their data compressed to save on storage space, while another user may not want to compress their data to improve retrieval speed. Further, a network of slice servers can be used to implement numerous DDSNs, each having different characteristics, and using a subset or all of the available slice servers to store data.

BRIEF DESCRIPTION OF THE SEVERAL VIEWS OF THE DRAWING(S)

Figure 3:
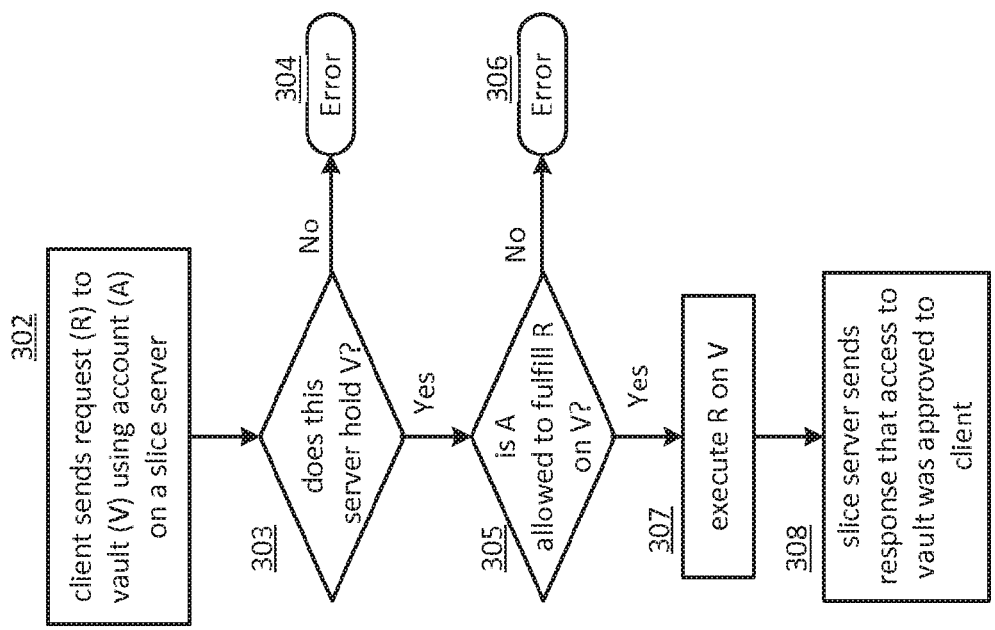
Figure 4:
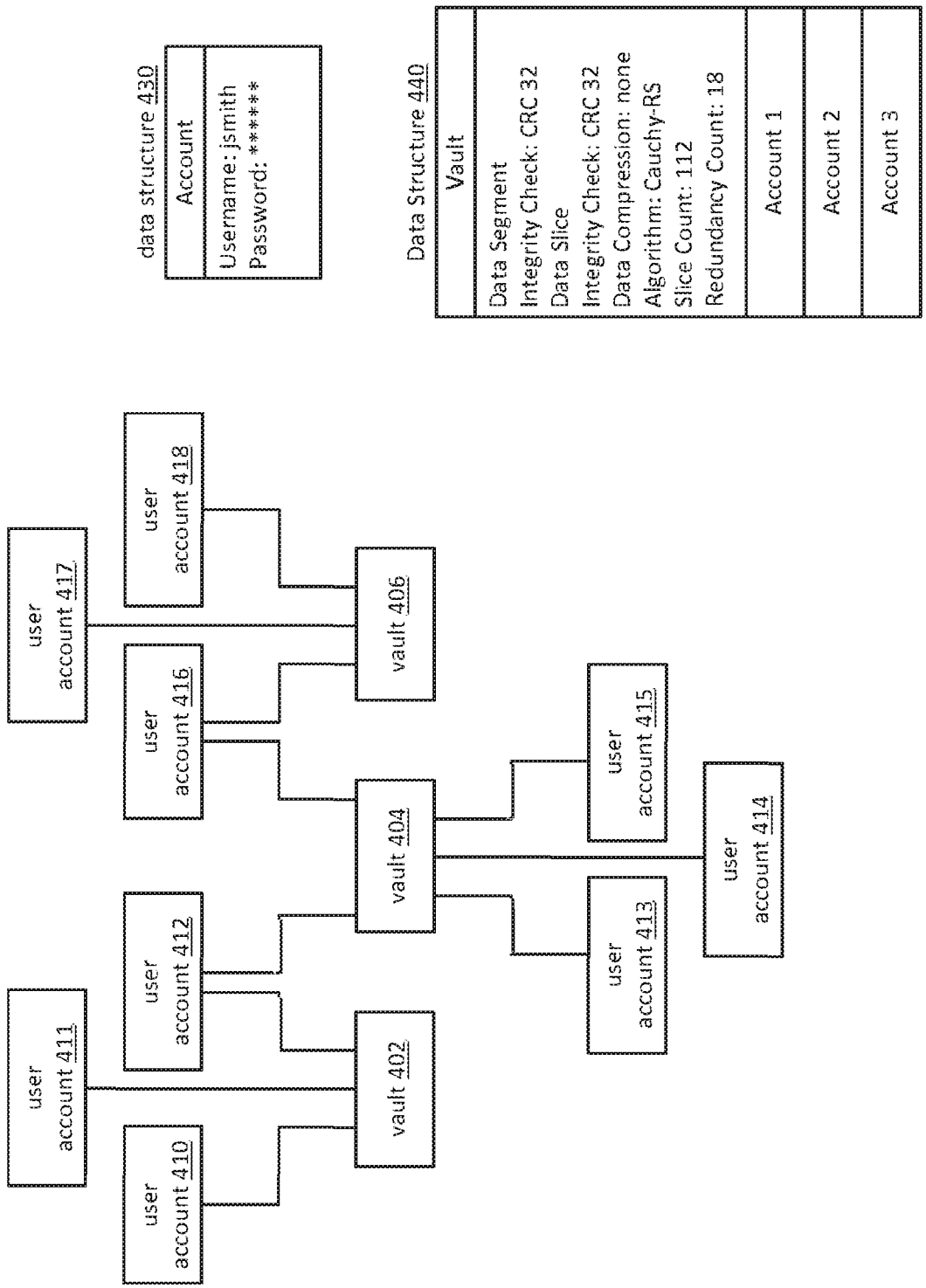

FIG. 3 is a flowchart illustrating the process by which a slice server authenticates requests received from various computers accessing a dispersed data storage network in accordance with the disclosed invention; and FIG. 4 is a data relationship diagram illustrating the relationship between user accounts and virtualized data storage vaults, as well as the structure of account and vault constructs in accordance with the disclosed invention.

DETAILED DESCRIPTION OF THE INVENTION

Figure 1:
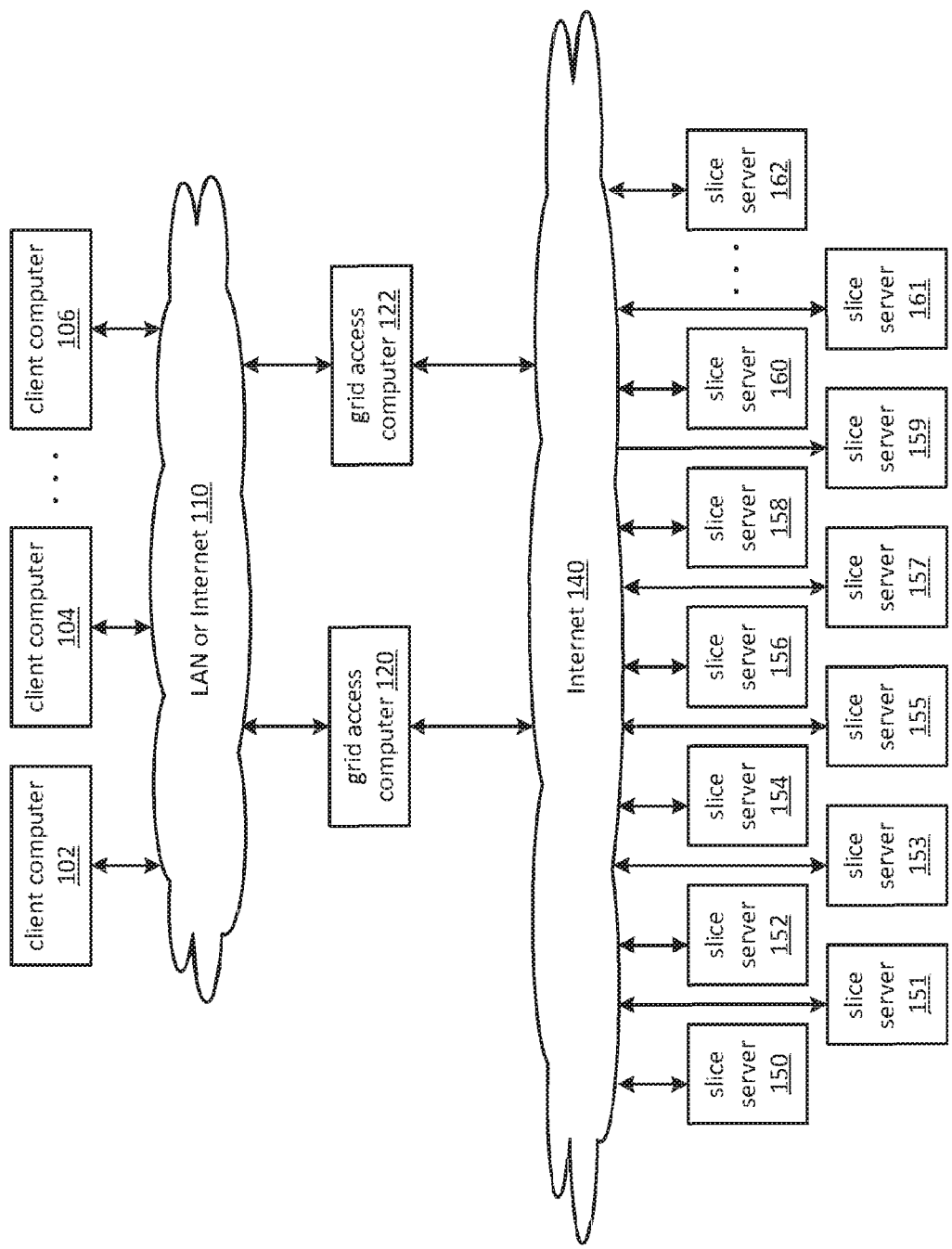
FIG. 1 is a network diagram of a dispersed data storage network constructed in accordance with an embodiment of the disclosed invention.

Turning to the Figures and to FIG. 1 in particular, a distributed computer system implementing a dispersed data storage grid is shown. An arbitrary number of slice servers 150-162 store data slices sent to them by networked client computers 102, 104, 106. As illustrated, some number of grid access computers 120, 122 allows access to the slice servers 150-162 by the client computers 102, 104, 106. Data segments are written to the grid by client computers 102, 104, 106. In accordance with an information dispersal algorithm, the data segments are sliced into multiple data slices that are then stored on slice servers 150-162.

As explained herein, the disclosed invention allows a network of slice servers to implement numerous dispersed data storage networks. In accordance with the disclosed invention, a subset of the available slice servers 150-162 is associated with a user account to form a dispersed data storage network. This information is stored in an accessible location, such as a grid access computer 120, 122, on each client computer 102, 104, 106, or elsewhere. This software construct, which is referred to herein as a "vault," allows for numerous DDSNs to be implemented from a network of slice servers. Each vault makes use of some number of slice servers, and a particular slice server may be associated with any number of vaults. There is no fixed relation between slice servers comprising a vault, except by the vault construct itself. By example, a first vault may be comprised of 16 slice servers. A second vault may utilize 4 slice servers in common with the first vault, and an additional 8 that are not used by the first vault.

In addition to storing information about what slice servers make up a particular DDSN, a vault will also store other information pertinent to the operation of a DDSN. This information includes what information dispersal algorithm ("IDA") is used on the DDSN, as well as the information required to operate the particular IDA, such as the number of slices that each data segment is divided into as well, which is also referred to as the quantity n, and the minimum number of data slices required to reconstruct a stored data segment, which is also referred to as the quantity m.

The vault also conglomerates other information that is relevant to the operation of a DDSN. The total storage that is available in a particular vault is stored, as well as the amount of storage that is presently occupied by data segments. In a fee-for-service system, this will prevent a particular user from using more storage than was paid for. In addition, a particular vault may require that data be encrypted, either before it is sliced, after it is sliced, or both before and after it is sliced. Accordingly, the vault structure can contain a field indicating that data segments and/or data slices are encrypted, as well as the particular algorithm that is used for encryption.

For certain applications, data stored on a DDSN may be compressed to increase the total amount of storage available. However, the use of compression can increase the time required to write and retrieve data. Accordingly, the vault can contain a field indicating if compression is to be used, and what type of compression should be used. In addition, while almost every DDSN makes use of integrity checks, certain applications may be better served by different types of integrity checks. For this purpose, the vault may contain a field allowing a user to specify a specific type of integrity check to be used for stored data segments as well as for stored data slices.

In addition to storing information about the particular DDSN associated with a vault, a vault may also include an access control list specifying which accounts are allowed to access the vault, and what permissions are associated with that account. For example, one user may have full access to a vault, while another user may only be allowed to read data segments from the vault, and not write data segments to, or modify data segments stored on the vault.

Figure 2:
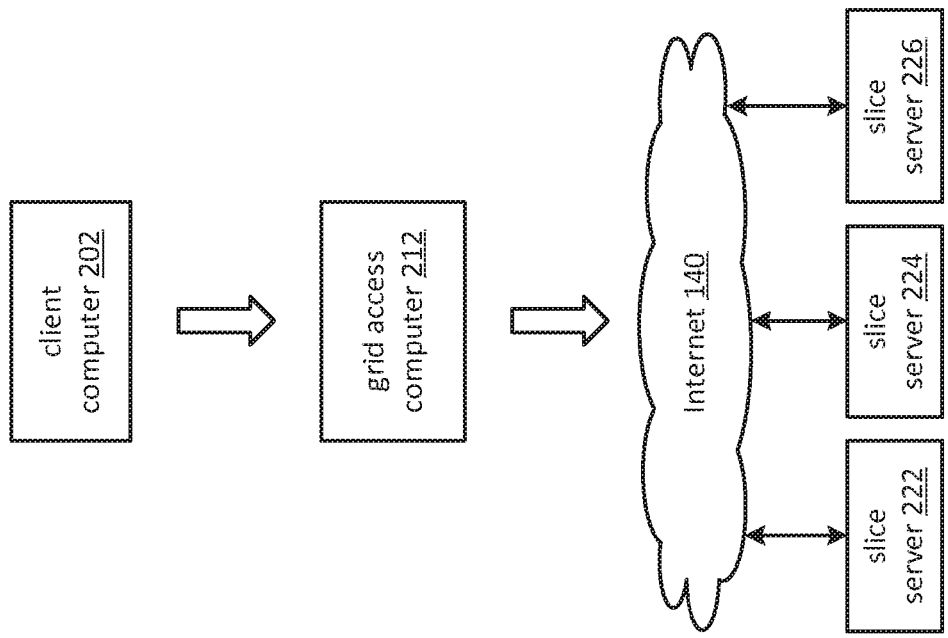
FIG. 2 is a simplified network diagram of the operation of one aspect of the disclosed invention by which a plurality of dispersed data storage networks can be implemented from a set of slice servers.
Figure 2:
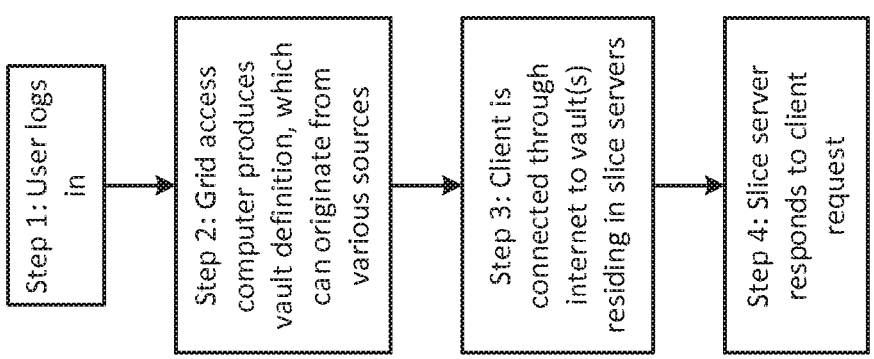

FIG. 2 explains the process of how access to a DDSN is handled through a vault. A user logs into a particular account at a client computer 202. As part of the login process, a grid access computer 212 assembles a vault definition, which may be resident on the grid access computer 212, stored on the slice servers 222, 224, 226 as distributed data, or stored elsewhere. The vault structure moderates access to a DDSN comprised of slice servers 222, 224, 226 by the client computer 202.

FIG. 3 illustrates the process by which a slice server authenticates a request from a client. After a client has logged into a vault, a client computer will originate one or more requests in step 302. Those requests will be directed to the appropriate slice server, and the slice server will validate that it can accept requests from the vault identified in the request in step 303. If the slice server cannot accept requests from the identified vault, an error is generated in step 304. The slice server also validates that the account identified in the request is allowed to make the specified request in step 305. If the slice server accepts requests from the identified vault and the identified account is allowed to make the specified request, the slice server will execute the request in step 307 and send a response back to the requesting client in step 308.

FIG. 4 illustrates the relationship between user accounts and vaults. Three vaults 402, 404, 406 are depicted, as well as nine users (user accounts) 410-418. Users 410, 411, and 412 have access to vault 402. User 412 also has access to vault 404, and as indicated, there is a many to many relationship between vaults and user accounts. Data structure 440 illustrates one way that vault information could be maintained. In particular, the illustrated structure shows the information dispersal algorithm used on the DDSN associated with the vault, i.e., Cauchy Reed-Solomon. In addition, the information dispersal parameters are identified, i.e., data segments are divided into data slices, of which any 18 may be lost without compromising the integrity of the stored data. Further, the vault data structure shows that no data compression is used, and that CRC-32 is used as an integrity check for both stored data segments and stored data slices. As illustrated, the data structure does not indicate if stored data is encrypted, although alternative data structures could. Finally, data structure lists three accounts that are allowed to access this particular vault. In addition to listing the associated accounts, the permissions granted to those accounts could also be listed here as well. As permissions are well-known in the art, they are not discussed further here.

FIG. 4 also shows data structure 430, which illustrates one way that a user account could be represented, namely by a username and a password. However, this particular representation of a user account is not a limitation of the invention; other methods well-known in the prior art would work just as well, for instance, biometric information. The foregoing description of the invention has been presented for purposes of illustration and description and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification but be defined by the claims set forth below.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A system comprising:
    a plurality of storage units each including a network port operably coupled to a network, wherein one or more storage vaults is associated with the plurality of storage units and each storage vault of the one or more storage vaults represents a software-constructed grouping of storage units of the plurality of storage units, wherein the software-constructed grouping of storage units stores encoded data slices, and wherein a data segment is encoded using an information dispersal algorithm to produce the encoded data slices; and
    a grid access manager including a network port operably coupled to the network, wherein the grid access manager:
        generates a data structure pertaining to the software-constructed grouping of storage units, wherein the data structure includes:
            an indication of the software-constructed grouping of storage units;
            the information dispersal algorithm;
            storage capacity information of the software-constructed grouping of storage units; and
            information regarding one or more associated user accounts; and
    wherein a storage unit of the software-constructed grouping of storage units:
        receives, from a client computer of the system via the network port, a request regarding the data segment stored in the software-constructed grouping of storage units;
        obtains, from the data structure, information regarding the request;
        determines whether the request is valid based on the information regarding the request; and
        when the request is valid:
            executes the request.

2. The system of claim 1, wherein the data structure further includes:
    an indication of an encryption algorithm used to encrypt the data segment.

3. The system of claim 1, wherein the data structure further includes:
    an indication of a compression algorithm used to compress the data segment.

4. The system of claim 1, wherein the data structure further includes:
    an integrity check for the data segment.

5. The system of claim 1, wherein the data structure is stored by at least one storage unit of the software-constructed grouping of storage units.

6. The system of claim 1, wherein the data structure is stored by the grid access manager.

7. A method comprising:
- receiving, by a storage unit of a software-constructed grouping of storage units, a request regarding a data segment stored in the software-constructed grouping of storage units, wherein one or more storage vaults is associated with the plurality of storage units and a storage vault of the one or more storage vaults represents the software-constructed grouping of storage units of a plurality of storage units, wherein the software-constructed grouping of storage units stores encoded data slices, and wherein a data segment is encoded using an information dispersal algorithm to produce the encoded data slices;
- obtaining, by the storage unit, information regarding the request from a data structure pertaining to the software-constructed grouping of storage units, wherein the data structure includes:
  - an indication of the software-constructed grouping of storage units;
  - the information dispersal algorithm;
  - storage capacity information of the software-constructed grouping of storage units; and
  - information regarding one or more associated user accounts; and
- determining, by the storage unit, whether the request is valid based on the information regarding the request; and
- when the request is valid:
  - executing, by the storage unit, the request.

8. The method of claim 7, wherein the data structure further includes an indication of an encryption algorithm used to encrypt the data segment.

9. The method of claim 7, wherein the data structure further includes an indication of a compression algorithm used to compress the data segment.

10. The method of claim 7, wherein the data structure further includes: an integrity check for the data segment.

11. The method of claim 7, wherein the data structure is stored by at least one storage unit of the software-constructed grouping of storage units.

12. The method of claim 7, wherein the data structure is stored by a grid access manager.

* * * * *